(12) United States Patent
Venkatesan et al.

(10) Patent No.: US 10,097,823 B1
(45) Date of Patent: Oct. 9, 2018

(54) FAILURE RECOVERY FOR REAL-TIME AUDIO AND VIDEO ENCODING, DECODING, AND TRANSCODING

(71) Applicant: Harmonic, Inc., San Jose, CA (US)

(72) Inventors: Kavitha Venkatesan, San Jose, CA (US); Arun Kumar Poruri, Mountain View, CA (US)

(73) Assignee: Harmonic, Inc., San Jose, CA (US)

( * ) Notice: Subject to any disclaimer, the term of this patent is extended or adjusted under 35 U.S.C. 154(b) by 160 days.

(21) Appl. No.: 14/940,405

(22) Filed: Nov. 13, 2015

(51) Int. Cl.
- *H04N 19/85* (2014.01)
- *H04N 19/103* (2014.01)
- *H04N 19/154* (2014.01)

(52) U.S. Cl.
CPC ......... *H04N 19/103* (2014.11); *H04N 19/154* (2014.11); *H04N 19/85* (2014.11)

(58) Field of Classification Search
CPC .................................................. H04N 19/103
See application file for complete search history.

(56) References Cited

U.S. PATENT DOCUMENTS

| | | | | |
|---|---|---|---|---|
| 6,307,948 B1 * | 10/2001 | Kawasaki | .............. | H04N 7/147 340/576 |
| 7,778,326 B1 * | 8/2010 | Chen | ....................... | H04L 47/10 370/468 |
| 8,171,157 B2 * | 5/2012 | Khan | .................. | H04L 47/2416 709/235 |
| 8,558,863 B2 * | 10/2013 | Naidu | .................... | H04N 7/147 348/14.01 |
| 8,693,648 B1 * | 4/2014 | Drugge | .................. | G06Q 50/01 348/14.08 |
| 8,780,978 B2 * | 7/2014 | Polisetty | ................. | G10L 25/78 375/240.03 |
| 8,832,190 B1 * | 9/2014 | Leske | ................ | H04N 21/4788 709/204 |
| 8,908,005 B1 * | 12/2014 | Leske | .................... | H04N 7/152 348/14.09 |
| 8,914,532 B2 * | 12/2014 | Yamada | .................. | G10L 25/69 709/231 |
| 8,976,223 B1 * | 3/2015 | Leske | ...................... | H04N 7/15 345/473 |
| 9,001,178 B1 * | 4/2015 | Leske | .................... | H04N 7/155 348/14.08 |

(Continued)

*Primary Examiner* — Jay Patel
*Assistant Examiner* — Irfan Habib
(74) *Attorney, Agent, or Firm* — Brokaw Patent Law PC; Christopher J Brokaw

(57) ABSTRACT

Approaches for recovering from a disruption in a live input stream when performing an encoding, transcoding, or decoding operation. A higher quality input stream and a lower quality input stream are received. The two streams may be an audio or video data stream. A real-time encoding, decoding, or transcoding operation is performed using the higher quality input stream. When a disruption in the higher quality input stream occurs, the real-time encoding, decoding, or transcoding operation is performed using the lower quality input stream. A state diagram that considers how long one or more of the higher quality input stream and the lower quality input stream have been available is used in transitioning from using the lower quality input stream to the higher quality input stream in the performance of the real-time encoding, decoding, or transcoding operation.

20 Claims, 4 Drawing Sheets

(56) References Cited

U.S. PATENT DOCUMENTS

| | | | |
|---|---|---|---|
| 9,077,850 B1* | 7/2015 | Groves | H04N 7/155 |
| 9,239,949 B2* | 1/2016 | Jung | G06K 9/00255 |
| 9,380,267 B2* | 6/2016 | Leske | H04N 7/147 |
| 9,542,611 B1* | 1/2017 | Mikhael | H04N 19/176 |
| 9,787,987 B2* | 10/2017 | Yadav | H04N 19/117 |
| 9,955,160 B1* | 4/2018 | Yadav | H04N 19/117 |
| 2004/0119814 A1* | 6/2004 | Clisham | H04N 7/141 |
| | | | 348/14.08 |
| 2010/0085416 A1* | 4/2010 | Hegde | H04N 7/147 |
| | | | 348/14.08 |
| 2012/0155773 A1* | 6/2012 | Tsukamoto | H04N 1/00286 |
| | | | 382/190 |
| 2013/0086615 A1* | 4/2013 | Williams | H04N 21/41407 |
| | | | 725/62 |
| 2013/0198210 A1* | 8/2013 | Lee | G06F 17/30861 |
| | | | 707/755 |
| 2013/0290557 A1* | 10/2013 | Baratz | H04L 65/60 |
| | | | 709/231 |
| 2014/0009563 A1* | 1/2014 | Leske | H04N 7/141 |
| | | | 348/14.08 |
| 2014/0022328 A1* | 1/2014 | Gechter | G06Q 30/06 |
| | | | 348/14.02 |
| 2015/0215580 A1* | 7/2015 | Leske | H04N 7/15 |
| | | | 348/14.08 |
| 2015/0237305 A1* | 8/2015 | Leske | H04N 7/15 |
| | | | 348/14.04 |

* cited by examiner

FAILURE RECOVERY FOR REAL-TIME AUDIO AND VIDEO ENCODING, DECODING, AND TRANSCODING

FIELD OF THE INVENTION

Embodiments of the invention generally relate to recovering from problems encountered in a real-time feed when encoding, decoding, or transcoding the feed.

BACKGROUND

Real-time encoding, decoding, and transcoding platforms are frequently exposed to error prone audio inputs. Traditional platforms typically receive multiple audio inputs of varying quality. For example, a traditional platform might receive a high quality audio input stream and a lower quality audio input stream. If a problem is encountered with the high quality audio input stream during real-time encoding or transcoding, then the system typically will switch from the high quality audio input stream to use the lower quality audio input stream for the remainder of the real-time encoding or transcoding.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for recovering from a disruption in a live input stream when performing an encoding, transcoding, or decoding operation on the live input stream are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards recovering from a disruption in a live input stream when performing an encoding, transcoding, or decoding operation. Embodiments enable a fault-tolerant audio and/or video failover/redundancy switching mechanism that will automatically switch between a primary (or higher quality) and backup (or lower quality) audio or video feed when errors or disruptions are encountered in the feeds. Switching from the primary feed to a backup feed may be performed upon failure of the primary feed.

However, switching from the backup feed back to the primary feed is not performed automatically upon the primary feed recovering and becoming available. Instead, switching from the backup feed back to the primary feed is performed using a state diagram that considers, among other factors, how long one or more of the higher quality input stream and the lower quality input stream have been recently available without input errors. The state diagram intelligently handles state transitions to prevent switching too frequently between using the primary feed and the backup feed, which might cause output service disruption.

Advantageously, embodiments of the invention employ a state machine that handles inputs to an encoder/decoder/transcoder which experience occasional disruptions with minimal resulting disruption to the output. Embodiments may consider how many times the backup feed was used and the present quality of the primary feed prior to switching from the backup feed to the primary feed. The state machine shall be described in additional detail below with reference to FIG. 3. Prior to describing the state machine in detail, it will be helpful to appreciate the operational context in which the state machine may be employed.

Figure 1:
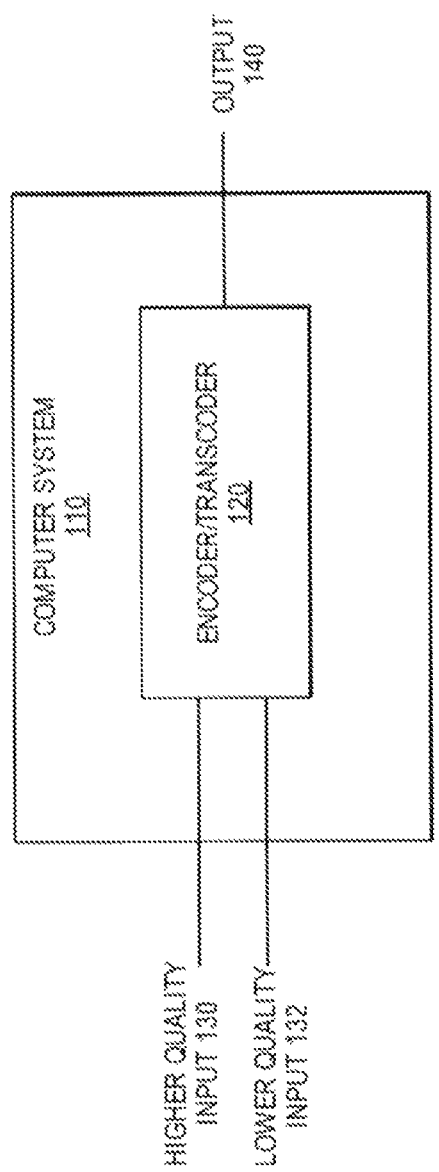
FIG. 1 is a block diagram which depicts a system for recovering from a disruption in a live input stream when performing an encoding, transcoding, or decoding operation according to an embodiment of the invention.

FIG. 1 is a system for recovering from a disruption in a live input stream when performing an encoding, transcoding, or decoding operation according to an embodiment of the invention. FIG. 1 depicts computer system 110, which represents any general purpose computer system which may be configured to execute software, such as encoder/transcoder 120. Additional description of a computer system is provided below with reference to FIG. 4.

Encoder/transcoder 120, as broadly used herein, represents software responsible for performing encoding, transcoding, or decoding operations. The name of component 120, namely encoder/transcoder 120, has been selected for purposes of providing a clear explanation, as it is anticipated that embodiments may be chiefly used with encoding and transcoding operations. However, component 120 may also be used in conjunctions with embodiments of the invention to perform decoding operations; embodiments of the invention expressly include the performance of decoding operations with reference to the state diagram of FIG. 3.

In the performance of an encoding, transcoding, or decoding operation, encoder/transcoder 120 may operate using one or more inputs to produce an output. The one or more inputs may correspond to audio data or video data.

Figure 3:
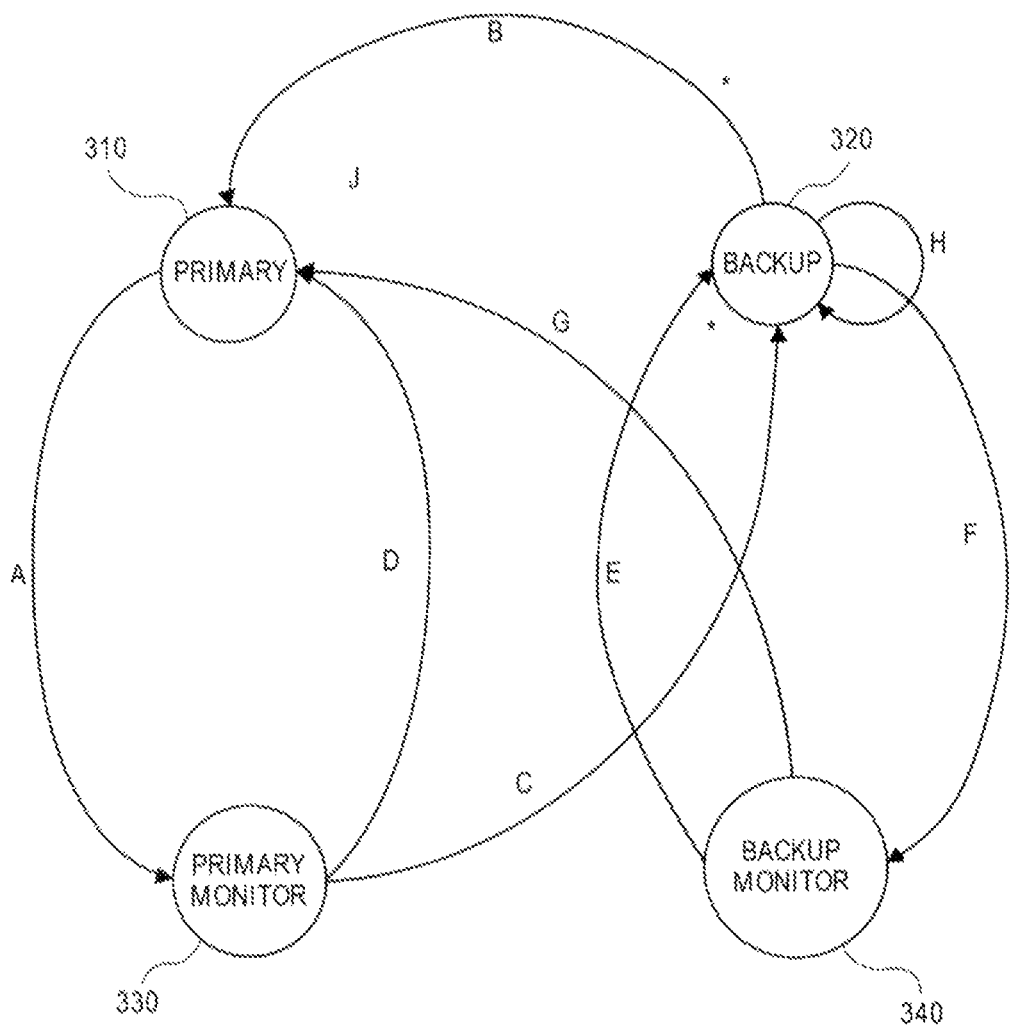
FIG. 3 is a state diagram employed by an embodiment of the invention.

FIG. 3 depicts two inputs to encoder/transcoder 120, namely higher quality input 130 and lower quality input 132. As an example, higher quality input 130 and lower quality input 132 may correspond to a live stream of uncompressed digital PCM samples. As another example, higher quality input 130 and lower quality input 132 may correspond to a live stream of pre-compressed formatted digital audio content. Higher quality input 130 and lower quality input 132 may also correspond to a live video stream.

Higher quality input 130 and lower quality input 132 may each correspond to a stream of audio data or video data. Higher quality input 130 and lower quality input 132 may describe the same content; however, higher quality input 130 may be expressed in a higher quality format than lower quality input 132, and similarly lower quality input 132 may be expressed in a lower quality format than higher quality input 130. To provide a concrete example, higher quality input 130 may correspond to a high definition video feed, whereas lower quality input 132 may correspond to a standard definition video feed.

Note that in certain embodiments, higher quality input 130 and lower quality input 132 may not necessarily correspond to input streams of different quality, but rather to input streams encoded in different formats. In such an embodiment, higher quality input 130 and lower quality input 132 are encoded using different formats, and may or may not correspond to streams of different qualities. For example, for audio data, higher quality input 130 may be encoded in an AC-3 format while lower quality input 132 may be encoded in an AAC format. As another example involving video data, higher quality input 130 may be encoded in an H.264 format while lower quality input 132 may be encoded in an MPEG-2 format.

Output 140 represents the resulting data stream produced as a result of encoder/transcoder 120 encoding, decoding, or transcoding one or more input streams.

In an embodiment, a disruption on high quality input 130 or low quality input 132 may occasionally be detected by encoder/transcoder 120. As used herein, a disruption on either high quality input 130 or low quality input 132 refers to that input being unavailable for a period of time or identified as being problematic. Non-limiting, illustrative examples of a disruption on high quality input 130 include: a CRC error, a loss of signal for a period of time, a loss of synchronization, a Continuity Count (CC) error, and the like.

Illustrative State Diagram

FIG. 3 is a state diagram employed by an embodiment of the invention. The state diagram of FIG. 3 depicts four states, namely primary state 310, backup state 320, primary monitor state 330, and backup monitor state 340. FIG. 3 also depicts certain state transitions, which shall be explained in greater detail below.

Primary state 310 is the state in which encoder/transcoder 120 uses high quality input 130 rather than low quality input 132 in performing encoding or transcoding. Note that encoder/transcoder 120 is not necessarily aware of which input is higher quality; however, in certain states, encoder/transcoder 120 is configured to use one of high quality input 130 and low quality input 132 in performing encoding, transcoding, or perhaps decoding operations. Backup state 320, on the other hand, is the state in which encoder/transcoder 120 uses low quality input 132 rather than high quality input 130 in performing encoding or transcoding. Primary monitor state 330 is an intermediate state that encoder/transcoder 120 uses to determine whether to continue using high quality input 130 or to switch to low quality input 132. Conversely, backup monitor state 340 is an intermediate state that encoder/transcoder 120 uses to determine whether to continue using low quality input 132 or to switch to high quality input 130.

In an embodiment, encoder/transcoder 120 initially begins in primary state 310. Encoder/transcoder 120 will remain in primary state 310 as long as no disruption is detected in high quality input 130. However, as soon as a disruption is detected in high quality input 130, then a state transition is made from primary state 310 to primary monitor state 330, which is depicted in FIG. 3 as transition A.

Upon entering primary monitor state 330, high quality input 130 and low quality input 132 are monitored for a time period equal to a configure length of time termed a 'monitor interval.' In an embodiment, the 'monitor interval' may be configurable time period. For example, the 'monitor interval' may be 10 seconds or some number of milliseconds, with an average rate being at or around 1 second. If the 'monitor interval' is configured to be too long of an interval of time, then the end user may experience a problematic or unavailable audio or video feed for longer than desired before an alternative is chosen. On the other hand, if the 'monitor interval' is configured to be too short of an interval of time, then encoder/transcoder 120 may alternate between using high quality input 130 and low quality input 132 too frequently, which can also be observable to the end user and requires more computational overhead than is desirable. If the monitor interval is too short, then the decision made by the state machine may not be very valuable. For example, if the interval is 100 ms, this short time interval may not be enough time to qualify an input as good or bad; hence, any decision made by state machine may not be "wise" or particularly valuable.

Note that while in primary monitor state 330, encoder/transcoder 120 continues to use high quality input 130 in performing encoding or transcoding assuming high quality input 130 is available; if high quality input 130 is not available while encoder/transcoder 120 is in primary monitor state 330, then silent audio or blank video frames are inserted in output 140 by the encoder/transcoder 120. In primary monitor state 330, encoder/transcoder 120 may compensate for any intermediate disruptions in high quality input 130 by using any approach deemed appropriate. For example, a loss of high quality input 130 supplying the primary audio feed may be dealt by encoder/transcoder 120 by repeating the last few audio frames or by replacing missing frames with silent audio or by fading. As another example, a loss of high quality input 130 supplying the primary video feed may be dealt by encoder/transcoder 120 by replacing a missing video frame with a prior available video frame or a black video frame.

After the expiration of the monitor interval, a decision is made as to which state to transition. If a small disruption was detected on high quality input 130, but high quality input 130 is otherwise deemed sufficiently reliable to continue use, then a transition is made back to primary state 310 (this transition is identified as transition D in FIG. 3). The rationale behind this transition is that since high quality input 130 is of higher quality than low quality input 132, preference is given to use of high quality input 130 unless the disruption detected on high quality input 130 is great enough to discontinue its use.

To provide express examples of criteria used by embodiments in determining that a transition should be made from primary monitor state 330 to primary state 310, the following conclusions may be used to justify moving from primary monitor state 330 to primary state 310: (a) determining that high quality input 130 has been available for more than 50% of the time during the monitor interval, (b) determining that both high quality input 130 and low quality input 132 were available for less than 50% of the time during the monitor interval, (c) determining that low quality input 132, but not high quality input 130, has been available for more than 50% of the time during the monitor interval; however, low quality input 132 experienced a disruption at the end of the monitor interval, (d) determining that high quality input 130 is unavailable at the end of the monitor interval, but low quality input 132 has been only available for less than 50% of the time during the monitor interval, and (e) determining that low quality input 132 is experiencing a disruption at the end of the monitor interval.

On the other hand, if low quality input 132 has been available for more than 50% of the time during the monitor interval and high quality input 130 was available for less than 50% of the time during the monitor interval, then a transition from primary monitor state 330 to backup state 320 is performed, assuming that low quality input 132 is available at the end of the monitor interval. This transition from primary monitor state 330 to backup state 320 is depicted as transition C in FIG. 3.

In backup state 320, low quality input 132 is used by encoder/transcoder 120 in encoding/transcoding. If, at any point in time, high quality input 132 is available and low quality input 132 experiences a disruption and is unavailable, then an immediate transition is made from backup state 320 to primary state 310. This transition is depicted in FIG. 3 as transition B.

While in backup state 320, if high quality input 130 and low quality input 132 are both available, then an attempt to move, using a deliberate and careful process, from backup state 320 to primary state 310 is made. In an embodiment, for a transition to be made from backup state 320 to primary state 310, high quality input 130 should not encounter any disruptions for a period of time equal or greater to a time interval termed 'auto-revert-back off-interval.' Each time a transition is made from backup state 320 to primary state 310, the length of time represented by the auto-revert-back off-interval will increase. The rationale behind increasing the requirements to transition is from backup state 320 to primary state 310 is that it is undesirable to repeatedly switch between high quality input 130 and low quality input 132, and so a switch should only be performed when it is sufficiently reasonable to believe the new state will be maintained for a reasonable period of time. In an embodiment, during the auto-revert-back off-interval, if there is a disruption on high quality input 130, then the auto-revert-back off-interval timer is restarted. Upon successful expiry of the auto-revert-back off-interval without any disruptions in high quality input 130, a transition (transition B in FIG. 3) is made from backup state 320 to primary state 310.

After a predetermined number of transitions from backup state 320 to primary state 310, embodiments may prevent any transition from backup state 320 to primary state 310 until high quality input 130 remains available without encountering any disruptions for a pre-determined interval of time termed the 'auto-revert-reset-interval.' If high quality input 130 has been available without disruption for a length of time equal or greater than the auto-revert-reset-interval, then embodiments may (1) allow the state to transition from backup state 320 to primary state 310 and (2) reset the value of the auto-revert-back off-interval to the default value.

Backup monitor state 340 is an intermediate state in which encoder/transcoder 120 uses low quality input 132 and determines whether to continue using low quality input 132 or switch to use high quality input 130. While in backup monitor state 340, encoder/transcoder 120 may compensate for any intermediate disruptions in low quality input 132 by using any approach deemed appropriate. For example, a loss of low quality input 132 supplying the backup audio feed may be dealt by encoder/transcoder 120 by repeating the last few audio frames or by replacing missing frames with silent audio or by fading. As another example, a loss of low quality input 132 supplying the backup video feed may be dealt by encoder/transcoder 120 by replacing a missing video frame with a prior available video frame or a black video frame.

Upon encountering a disruption in low quality input 132, a transition is made from backup state 320 to backup monitor state 340 (this is shown as transition F in FIG. 3). Upon transitioning from backup state 320 to backup monitor state 340, a 'monitor interval' timer is initiated. During the 'monitor interval,' both high quality input 130 and low quality input 132 are monitored for their availability. At the end of the 'monitor interval,' if both the high quality input 130 and the low quality input 132 were available for more than 50% of the 'monitor interval' time period, then a state transition is made from backup monitor state 340 to backup state 320 (this is shown as transition E in FIG. 3). However, at the end of the 'monitor interval,' if low quality input 132 was available for less than 50% of the 'monitor interval' time period, but high quality input 130 was available for more than 50% of the 'monitor interval' time period, then a state transition is made from backup monitor state 340 to primary state 310 (this is shown as transition G in FIG. 3). In an embodiment, by default, at the end of the 'monitor interval' time period, a transition is made from backup monitor state 340 to backup state 320 (this is shown as transition E in FIG. 3) unless the criteria was met to qualify for transition G.

Illustrative System

Figure 2:
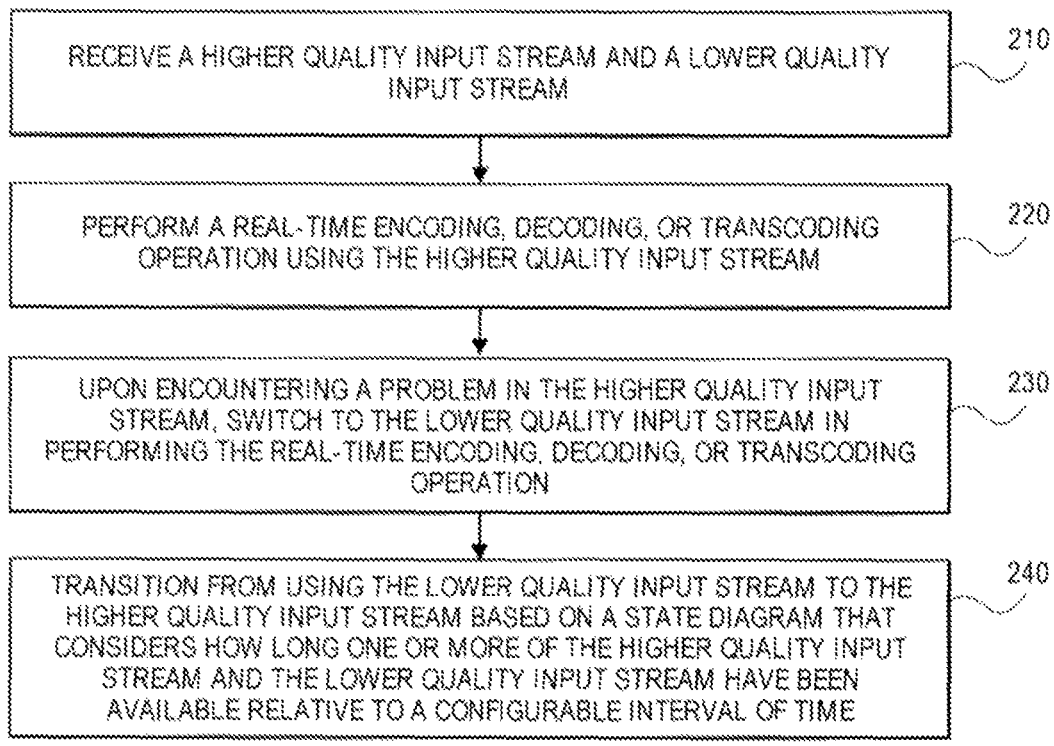
FIG. 2 is a flowchart depicting the steps of recovering from a disruption in a live input stream when performing an encoding, transcoding, or decoding operation according to an embodiment of the invention.

FIG. 2 is a flowchart depicting the steps of recovering from a disruption in a live input stream when performing an encoding, transcoding, or decoding operation according to an embodiment of the invention. In step 210, higher quality input 130 and lower quality input 132 are received by computer system 110. Higher quality input 130 and lower quality input 132 may correspond to real-time, live data feeds.

In step 220, a real-time encoding, decoding, or transcoding operation is performed by encoder/transcoder 120 using higher quality input 130. If available, the real-time encoding, decoding, or transcoding operation is performed using higher quality input 130. However, as higher quality input 130 is a live data feed, for a variety of reasons the data feed may encounter a problem, become momentarily disrupted, or otherwise become unavailable for varying periods of time. When higher quality input 130 is disrupted or is otherwise unavailable, step 230 is performed.

In step 230, upon encountering a disruption in higher quality input 130, encoder/transcoder performs the real-time encoding, decoding, or transcoding operation using lower quality input 132 rather than high quality input 130.

In step 240, a state diagram that considers how long one or more of higher quality input 130 and lower quality input 132 have been available is used in attempting to transition from using lower quality input 132 to higher quality input 130 in the performance of the real-time encoding, decoding, or transcoding operation by encoder/transcoder 120. The state diagram employed may operate as described above with respect to FIG. 3.

Advantageously, the state machine of FIG. 3 ensures that the transition between lower quality input 132 and higher quality input 130 is done so in a manner that optimizes the likelihood that higher quality input 132 will be used, if available, by encoder/transcoder 120 while minimizing the likelihood of flapping, or switching too frequently between lower quality input 132 and higher quality input 130, which can cause output service disruption.

Hardware Mechanisms

Figure 4:
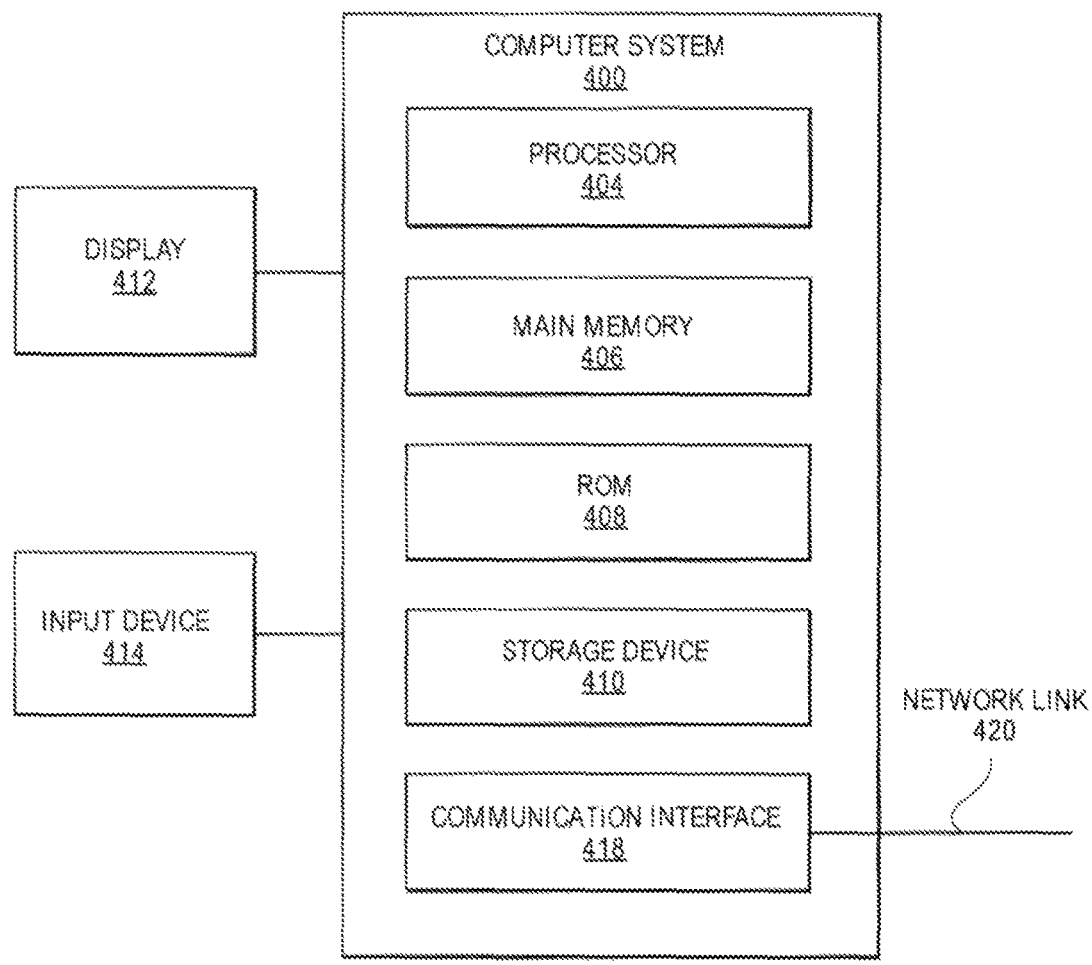
FIG. 4 is a block diagram that illustrates a computer system upon which an embodiment of the invention may be implemented.

FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums that store one or more sequences of instructions for recovering from a disruption in an input stream, which when executed by one or more processors, cause:
   receiving a higher quality input stream and a lower quality input stream;
   performing a real-time encoding, decoding, or transcoding operation using said higher quality input stream;
   upon encountering a disruption in the higher quality input stream, performing said real-time encoding, decoding, or transcoding operation using said lower quality input stream; and
   transitioning from using said lower quality input stream to said higher quality input stream in the performance of said real-time encoding, decoding, or transcoding operation based on a state diagram that considers how long one or more of the higher quality input stream and the lower quality input stream have been available relative to a configurable interval of time.

2. The one or more non-transitory computer-readable storage mediums of claim 1, wherein said state diagram further considers a number of times that disruptions have been encountered on said higher quality input stream in transitioning from a first state associate with using said lower quality input stream to a second state associated with the higher quality input stream.

3. The one or more non-transitory computer-readable storage mediums of claim 2, wherein as the number of times that disruptions have been encountered on said higher quality input stream increases, the state diagram requires a longer period of time to have elapsed without experiencing a disruption in the higher quality input stream to permit the transitioning from using said lower quality input stream to said higher quality input stream in the performance of said real-time encoding, decoding, or transcoding operation.

4. The one or more non-transitory computer-readable storage mediums of claim 1, wherein said configurable interval of time is a bounded period of time that includes or ends with a current time.

5. The one or more non-transitory computer-readable storage mediums of claim 1, wherein said higher quality input stream and lower quality input stream both correspond to audio content for a live transmission.

6. The one or more non-transitory computer-readable storage mediums of claim 1, wherein said higher quality input stream and lower quality input stream both correspond to video content for a live transmission.

7. The one or more non-transitory computer-readable storage mediums of claim 1, wherein the state diagram comprises at least four states.

8. The one or more non-transitory computer-readable storage mediums of claim 7, wherein said at least four states include a primary state, a backup state, a primary monitor state, and a backup monitor state.

9. The one or more non-transitory computer-readable storage mediums of claim 1, wherein said transitioning from using said lower quality input stream to said higher quality input stream in the performance of said real-time encoding, decoding, or transcoding operation is not performed automatically in response to said higher quality input stream becoming available.

10. An apparatus for recovering from a disruption in an input stream, which when executed by one or more processors, comprising:
one or more processors; and
one or more non-transitory computer-readable storage mediums storing one or more sequences of instructions, which when executed, cause:
receiving a higher quality input stream and a lower quality input stream;
performing a real-time encoding, decoding, or transcoding operation using said higher quality input stream;
upon encountering a disruption in the higher quality input stream, performing said real-time encoding, decoding, or transcoding operation using said lower quality input stream; and
transitioning from using said lower quality input stream to said higher quality input stream in the performance of said real-time encoding, decoding, or transcoding operation based on a state diagram that considers how long one or more of the higher quality input stream and the lower quality input stream have been available relative to a configurable interval of time.

11. The apparatus of claim 10, wherein said state diagram further considers a number of times that disruptions have been encountered on said higher quality input stream in transitioning from a first state associate with using said lower quality input stream to a second state associated with the higher quality input stream.

12. The apparatus of claim 10, wherein as the number of times that disruptions have been encountered on said higher quality input stream increases, the state diagram requires a longer period of time to have elapsed without experiencing a disruption in the higher quality input stream to permit the transitioning from using said lower quality input stream to said higher quality input stream in the performance of said real-time encoding, decoding, or transcoding operation.

13. The apparatus of claim 10, wherein said configurable interval of time is a bounded period of time that includes or ends with a current time.

14. The apparatus of claim 10, wherein said higher quality input stream and lower quality input stream both correspond to audio content for a live transmission.

15. The apparatus of claim 10, wherein said higher quality input stream and lower quality input stream both correspond to video content for a live transmission.

16. The apparatus of claim 10, wherein the state diagram comprises at least four states.

17. The apparatus of claim 16, wherein said at least four states include a primary state, a backup state, a primary monitor state, and a backup monitor state.

18. The apparatus of claim 10, wherein said transitioning from using said lower quality input stream to said higher quality input stream in the performance of said real-time encoding, decoding, or transcoding operation is not performed automatically in response to said higher quality input stream becoming available.

19. A method for recovering from a disruption in an input stream, comprising:
receiving a higher quality input stream and a lower quality input stream;
performing a real-time encoding, decoding, or transcoding operation using said higher quality input stream;
upon encountering a disruption in the higher quality input stream, performing said real-time encoding, decoding, or transcoding operation using said lower quality input stream; and
transitioning from using said lower quality input stream to said higher quality input stream in the performance of said real-time encoding, decoding, or transcoding operation based on a state diagram that considers how long one or more of the higher quality input stream and the lower quality input stream have been available relative to a configurable interval of time.

20. The method of claim 19, wherein as the number of times that disruptions have been encountered on said higher quality input stream increases, the state diagram requires a longer period of time to have elapsed without experiencing a disruption in the higher quality input stream to permit the transitioning from using said lower quality input stream to said higher quality input stream in the performance of said real-time encoding, decoding, or transcoding operation.

* * * * *